United States Patent
Ouyang

(10) Patent No.: US 11,105,268 B2
(45) Date of Patent: Aug. 31, 2021

(54) FUEL POLISHING SYSTEM FOR TEST CELLS

(71) Applicant: Solar Turbines Incorporated, San Diego, CA (US)

(72) Inventor: Xing Ouyang, San Diego, CA (US)

(73) Assignee: Solar Turbines Incorporated, San Diego, CA (US)

( * ) Notice: Subject to any disclaimer, the term of this patent is extended or adjusted under 35 U.S.C. 154(b) by 266 days.

(21) Appl. No.: 15/970,593

(22) Filed: May 3, 2018

(65) Prior Publication Data
US 2019/0338708 A1 Nov. 7, 2019

(51) Int. Cl.
*G01M 15/14* (2006.01)
*F02C 7/232* (2006.01)
*F02C 9/28* (2006.01)
*F02C 9/26* (2006.01)

(52) U.S. Cl.
CPC .............. *F02C 7/232* (2013.01); *F02C 9/263* (2013.01); *F02C 9/28* (2013.01); *G01M 15/14* (2013.01)

(58) Field of Classification Search
CPC .. F02C 7/22; F02C 7/222; F02C 7/232; F02C 7/236; F02C 6/00; F02C 6/02; F02C 9/26; F02C 9/263; F02C 9/36; F05D 2260/12; G01M 15/14; G01M 15/02; F23K 2300/00; F23K 2300/10; F23K 2300/20; F23K 2300/201; F23K 2300/202; F23K 2300/206; F23K 5/02; F23K 5/04; F23K 5/06; F23K 5/08; F23K 5/10; F23K 5/12; F23K 5/14; F23K 5/18; F23K 2203/104
See application file for complete search history.

(56) References Cited

U.S. PATENT DOCUMENTS 3,908,360 A * 9/1975 Meyer ................... F02C 7/236 60/39.281
4,020,632 A * 5/1977 Coffinberry ............. F02C 7/14 60/773

(Continued)

OTHER PUBLICATIONS

"Pressure Regulator vs. Backpressure Regulator", Web <https://plastomatic.com/technical-article/pressure-regulator-vs-backpressure-regulator/>, 2017 retrieved from <https://web.archive.org/web/20170304115028/https://plastomatic.com/technical-article/pressure-regulator-vs-backpressure-regulator/ (Year: 2017).*

*Primary Examiner* — Scott J Walthour
*Assistant Examiner* — Todd N Jordan
(74) *Attorney, Agent, or Firm* — Procopio, Cory, Hargreaves & Savitch LLP

(57) ABSTRACT

Systems and methods for providing an automatic fuel polishing and on-demand fuel delivery for one or more gas turbine engine test cells are provided. The system can have a polishing loop that can continuously polish fuel. The polishing loop can have at least a fuel storage tank, a pump assembly, a filtration system, and a flow meter. The system can also have fuel delivery path coupled to the polishing loop at a three way junction. The three way junction can enable the continuous polishing loop when no test cells are operating. Upon initiation of one or more test cells, the delivery path can draw fuel from the polishing loop via the three way junction for use by the test cells. The flow meter can measure a corresponding drop in flow within the polishing loop and cause an increase in flow by the pump assembly.

12 Claims, 2 Drawing Sheets

(56) References Cited

U.S. PATENT DOCUMENTS

| | | | | |
|---|---|---|---|---|
| 6,708,481 | B2* | 3/2004 | Kamen | F23D 11/26 |
| | | | | 60/39.6 |
| 8,157,987 | B1* | 4/2012 | Keenan | F02M 37/22 |
| | | | | 123/514 |
| 8,951,019 | B2* | 2/2015 | Hains | F02C 7/22 |
| | | | | 417/5 |
| 9,909,442 | B2 | 3/2018 | Desai et al. | |
| 10,471,374 | B2* | 11/2019 | Cope | F02M 37/0064 |
| 2007/0130911 | A1* | 6/2007 | Goldberg | F02C 7/22 |
| | | | | 60/39.281 |
| 2010/0285413 | A1* | 11/2010 | Borissov | F23C 5/32 |
| | | | | 431/7 |

* cited by examiner

FUEL POLISHING SYSTEM FOR TEST CELLS

BACKGROUND

Technological Field

This disclosure relates to fuel supply systems for gas turbine engines. More specifically, this disclosure relates to systems and methods for providing automated and simultaneous fuel polishing and one-way fuel supply to one or more gas turbine engines.

Related Art

As a part of research and development, multiple gas turbine engines, sometime referred to as test cells, may be used to test and evaluate new improvements to gas turbine engine technologies. Multiple test cells can be coupled to a single fuel supply to simplify liquid fuel plumbing requirements and make refueling more convenient. Some test cell fuel management systems employ manually operated liquid fuel supply systems, coupled with a liquid fuel return piping networks. This type of system can provide individual gas turbine engines (test cells) with fuel, but also implements a fuel return pumping station at every individual test cell. In such an example, the fuel system is manually activated to supply fuel to the individual test cells. However, this also requires activation of the liquid fuel return system at each test cell to return liquid fuel not consumed by the given test cell. This disclosure presents solutions to one or more issues identified by the inventors.

U.S. Pat. No. 9,909,442 to Desai, discloses a method for controlling a position actuation system component in a gas turbine engine based on a modified proportional and integral control loop. The method includes determining an error value between a demand signal for the position actuation system component and a position signal for the position actuation system component. The method also includes determining an integral gain scaler as a function of a scheduling parameter value and determining an integral gain based on the determined error value and the determined integral gain scaler. Additionally the method includes determining a proportional gain scaler as a function of the scheduling parameter value and determining a proportional gain based on the determined error value and the determined proportional portion gain scaler. The method adds the determined integral gain with the determined proportional gain to determine a null current value for the position actuation system component.

SUMMARY

In general, this disclosure describes systems and methods related to supplying fuel to one or more gas turbine engine test cells. More specifically, this disclosure relates to providing an automatic fuel polishing and on-demand fuel delivery system for a plurality of gas turbine engine test cells. The systems, methods and devices of this disclosure each have several innovative aspects, no single one of which is solely responsible for the desirable attributes disclosed herein.

One aspect of the disclosure provides a system for providing fuel to one or more turbine engine test cells. The system can have a polishing loop configured to continuously polish fuel. The polishing loop can have a fuel storage tank configured to store fuel for the one or more test cells. The polishing loop can have a pump assembly in fluid communication with the fuel storage tank and configured to maintain fuel flow within a fuel supply line of the polishing loop. The polishing loop can have a filtration system in fluid communication with the pump assembly, and having one or more filters. The polishing loop can have a junction in fluid communication with the filtration system and the fuel storage tank via the fuel supply line of the polishing loop. The polishing loop can have a flow meter configured to measure fuel flow through fuel supply line of the polishing loop. The system can have a fuel delivery line coupled to the polishing loop at the junction and configured to deliver fuel to the one or more test cells. The system can have a fuel control system. The fuel control system can receive fuel flow information from the flow meter and control fuel flow within the fuel supply line provided by the pump assembly.

Another aspect of the disclosure provides a system for automatic fuel delivery and fuel polishing. The system can have a pressure line. The pressure line can have a fuel supply configured to store fuel. The pressure line can have a pump assembly in fluid communication with the fuel supply and configured to maintain a fuel supply flow within the pressure line. The pressure line can have a filtration system in fluid communication with the pump assembly. The system can have a return line. The return line can have a flow meter in fluid communication with the filtration system and disposed between filtration system and the fuel supply. The flow meter can provide fuel flow information associated with fuel flow within the return line in relation to a fuel flow set point. The system can have a junction coupling the pressure line and the return line to a delivery line in fluid communication with one or more gas turbine engine test cells. The system can have a controller communicatively coupled to the flow meter and the pump assembly. The controller can receive the fuel flow information from the flow meter. The controller can command the pump assembly to increase fuel flow if fuel flow through the flow meter falls below the set point based on an initiation of the one or more gas turbine engine test cells.

Another aspect of the disclosure provides a method for simultaneous fuel delivery and fuel polishing. The method can include pressurizing fuel within a polishing loop via a pump assembly. The method can include filtering the fuel using a filtration system coupled to the pump assembly to provide polished fuel to one or more gas turbine engine test cells. The method can include measuring fuel flow through the polishing loop using a flow meter in fluid communication with the pump assembly and the filtration system. The method can include increasing flow within the polishing loop in response to a decrease in fuel flow within the polishing loop indicated by the flow meter. The method can include decreasing flow within the polishing loop in response to an increase in fuel flow within the polishing loop indicated by the flow meter.

Other features and advantages of the present disclosure should be apparent from the following description which illustrates, by way of example, aspects of the disclosure.

BRIEF DESCRIPTION OF THE FIGURES

The details of embodiments of the present disclosure, both as to their structure and operation, may be gleaned in part by study of the accompanying drawings, in which like reference numerals refer to like parts, and in which.

DETAILED DESCRIPTION

The detailed description set forth below, in connection with the accompanying drawings, is intended as a description of various embodiments and is not intended to represent the only embodiments in which the disclosure may be practiced. The detailed description includes specific details for the purpose of providing a thorough understanding of the embodiments. However, it will be apparent to those skilled in the art that the disclosure without these specific details. In some instances, well-known structures and components are shown in simplified form for brevity of description.

Figure 1:
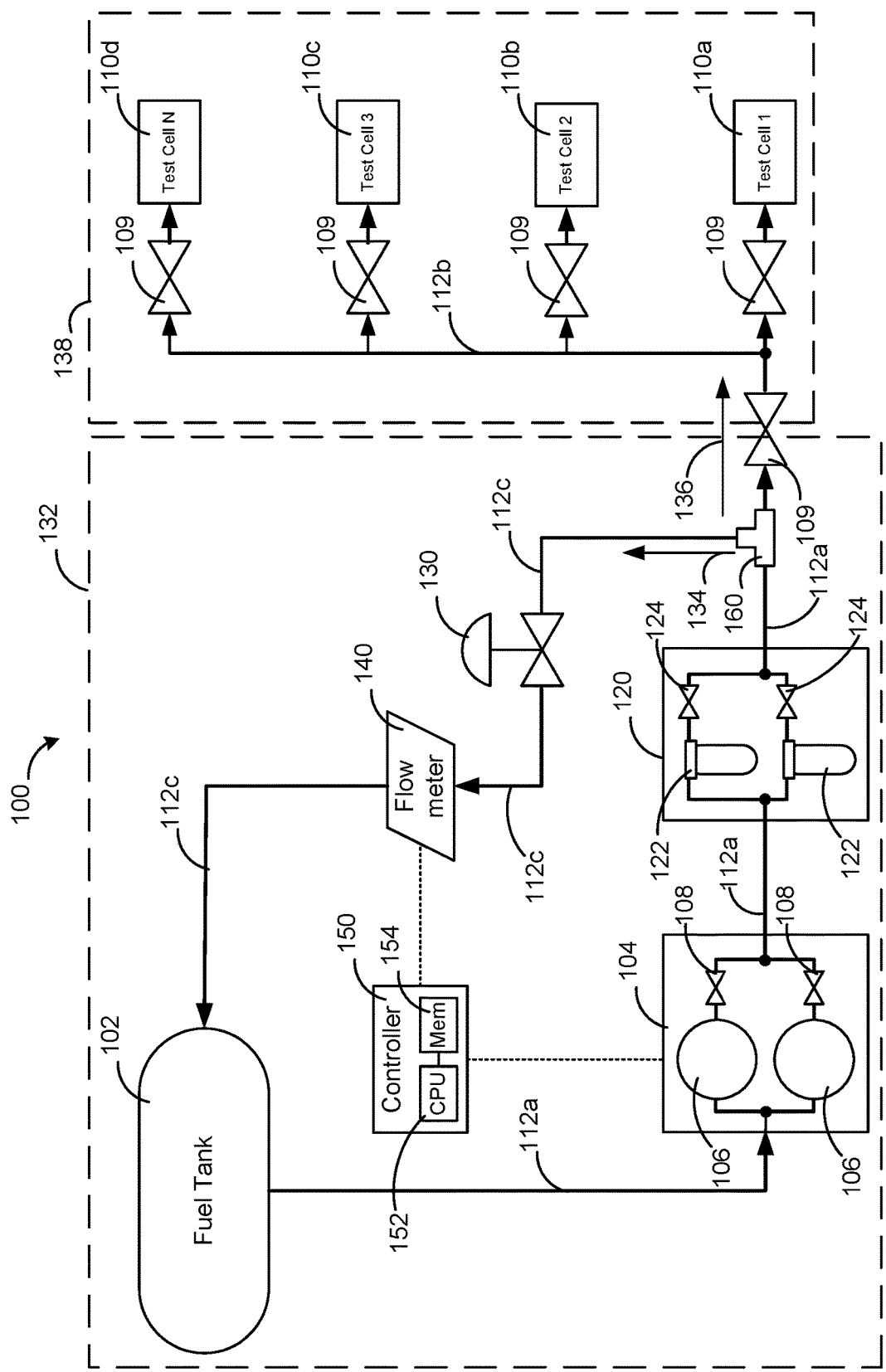
FIG. 1 is a schematic diagram of a dual purpose fuel delivery system.

FIG. 1 is a schematic diagram of a dual purpose fuel delivery system. A dual purpose fuel delivery system (system) 100 can provide on-demand fuel delivery for one or more gas turbine engines (test cells) 110. The test cells 110 are labeled individually as a first test cell 110a, a second test cell 110b, a third test cell 110c, and fourth test cell 110d, and may be referred to collectively as test cells 110. In some embodiments, more or fewer than four test cells 110 may be present in the system 100. This aspect is indicated by the "N-th" test cell label in the fourth test cell 110d. Each of the test cells 110 can represent a gas turbine engine. The gas turbine engine test cells 110 can receive fuel from fuel supply lines 112 of the system 100 for use in testing and evaluation of turbine engine components for example. The fuel supply lines 112 are labeled 112a, 112b, 112c. The fuel supply line 112a and the fuel supply line 112c couples the components of a pressure side and return side of the polishing loop 132 in a continuous circuit. Thus, the fuel supply lines 112a can form a pressure line of the polishing loop 132, while the fuel supply lines 112c form a return line of the polishing loop 132. The fuel supply line 112a and the fuel supply line 112c can also be referred to herein as fuel polishing lines 112a, 112c.

In some embodiments, the fuel supply line 112b can form a delivery side, or a fuel delivery path 138. The fuel delivery path 138 can be in fluid communication with the polishing loop 132 at a junction 160 and convey fuel to the one or more test cells 110. The fuel delivery path 138 may also be referred to herein as a fuel delivery line. In some embodiments, the junction 160 can be a specific T-shaped, Y-shaped, or similarly shaped connector, coupling the polishing loop 132 to the fuel delivery path 138. In some other embodiments, the junction 160 can also simply be a connection point of the fuel supply line 112a (pressure line) the fuel supply line 112c (return line) and the fuel supply line 112b (delivery line).

The system 100 can further provide for continuous fuel polishing. The fuel polishing function can be continuous even when one or more of the test cells 110 is operating. Fuel polishing as used herein refers to a cleaning process used to remove, for example, water, sediment, and/or microbial contamination from oil and hydrocarbon fuel (e.g., diesel, red diesel and biodiesel) in storage. This fuel contamination, also known as 'fuel bugs' or 'diesel bugs' build up over time in stored fuels if not treated on a regular basis.

The system can have a tank 102. The tank 102 can be a fuel tank, storage tank, or other applicable container for storing an amount of fuel for operating the test cells 110. The fuel can be liquid fuel such as diesel. The diesel can be for example, number two (#2) diesel for use in large scale industrial turbine engines. Other varieties of diesel are also applicable without departing from the invention.

The system 100 can also have a fuel pump assembly 104 in fluid communication with the fuel tank 102 via the fuel supply lines 112a, 112c. The fuel pump assembly 104 can have one or more fuel pumps 106. The fuel pumps 106 can be, for example variable frequency drive (VFD) pumps. The fuel pump assembly 104 can also have one or more isolation valves (valves) 108. The fuel pumps 106 and the valves 108 can be arranged in parallel to allow for a fail-safe or primary/backup arrangement in the event there is a failure in one of the pumps 106. The valves 108 are depicted downstream of the pumps 106, however in some embodiments, the valves 108 may be upstream of the pumps 106. The fuel pump assembly can also have sets of valves 108 both upstream and downstream of the pumps 106. The valves 108 can further allow for replacement or repair of pumps 106 or pump components while the system 100 is actively operating.

The system 100 can have a filtration system 120 in fluid communication with the pumps 106. The filtration system 120 can have one or more filters 122. The filters 122 can filter the fuel to remove contaminants and maintain a high level of fuel quality for delivery to the test cells 110. The filtration system can further have valves 124 similar to the valves 108. The valves 124 can provide an automatic failover or automatic switch in a primary/secondary filter arrangement in the event one filter 122 needs replacement. The filtration system 120 can further provide the fuel polishing capability for the system 100. The filtration system 120 can be in fluid communication with the junction 160 completing the pressure side (pressure line) of the polishing loop 132. In some embodiments, the pump assembly 104 and the filtration system 120 can be arranged in any order; one need not necessarily precede the other within the polishing loop 132.

The system 100 can have a back pressure regulator 130 in fluid communication with the filtration system 120 via the junction 160. The back pressure regulator 130 can serve to maintain a constant pressure within the system 100 under varying fuel demand from the test cells 110. The back pressure regulator 130 can be a fluid mechanical device capable of keeping a constant fluid pressure at an inlet of the back pressure regulator, as long a fluid flow is maintained in the polishing loop 132 and thus through the back pressure regulator 130. The back pressure regulator 130 can mechanically provide and maintain a constant pre-set pressure of the fuel supply to the test cells 110 regardless of how fuel flow demand from the test cells 110 changes.

The system 100 can also have a flow meter 140 in fluid communication with the back pressure regulator 130. The flow meter can provide an indication of varying fuel flow through the polishing loop. In some embodiments, the flow meter 140 can provide a current output based on the flow through the flow meter 140.

When the test cells 110 are not operating, the pump assembly 104 can provide pressure and fuel flow within the system to continuously filter or polish liquid fuel. Liquid fuel can flow from the fuel supply or tank 102, via the pump assembly 104 through the filtration system 120, to the junction 160 via the fuel supply lines 112a forming the pressure side of the polishing loop 132. Liquid fuel can then flow from the junction 160 via the back pressure regulator 130, and the flow meter 140 back to the tank 102 via the fuel supply line 112c, forming the return side of the fuel polishing loop 132. The fuel polishing loop 132 may also be referred to herein as a polishing loop or a bypass circuit, as it "bypasses" the test cells 110 when the test cells 110 are not in operation. In this way, the system can provide continuous fuel polishing. This can be advantageous, because over time, algae can grow in the fuel, and other particulate contaminants may be presence in fuel introduced to the tank 102.

In some embodiments, the system 100 can therefore establish a "reserved flow" within the polishing loop 132. The reserved flow can compensate for changes in fuel demand by the test cells 110. When initiated or while in operation, the test cells 110 can draw fuel from the reserved flow via the junction 160.

The system 100 can also have a controller 150. The controller 150 can be communicatively coupled to the flow meter 140 and the pump assembly 104. The flow meter 140 can provide an indication of fuel flow, or fuel flow information regarding the rate and/or volume of fuel returning to the tank 102 to the controller 150. Fuel flow information from the flow meter 140 can also allow the controller 150 to adjust the pump rate of the pump assembly 104 to maintain constant fuel flow and supply a required amount of fuel to operating test cells 110.

The controller 150 can have one or more processors or processor units (processor) 152. The processor 152 can control operation of the controller 150. The processor 152 can also be referred to as a central processing unit (CPU). The processor 152 is labeled as "CPU" 152 in FIG. 1. The processor 152 can also have or be a component of a processing system implemented with one or more processors 152. The one or more processors can be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The controller 150 can have a memory 154 coupled to the processor 152. The memory 154 can include both read-only memory (ROM) and random access memory (RAM). The memory 154 can provide instructions and data to the processor 152. At least a portion of the memory 154 can also include non-volatile random access memory (NVRAM). The processor 152 can perform logical and arithmetic operations based on program instructions stored within the memory 154. The instructions in the memory 154 can be executable to implement the methods described herein.

The memory 154 can also include machine-readable media for storing software. Software can be various forms of instructions, whether referred to as software, firmware, middleware, microcode, hardware description language, or otherwise. Instructions can include code (e.g., in source code format, binary code format, executable code format, or any other suitable format of code). The instructions, when executed by the one or more processors, cause the processing system to perform the various functions described herein.

In some embodiments, the valves 108 can be manually actuated. In some other embodiments, the controller 150 can further be in communication with the valves 108 and the valves 124 as needed to operate and control them. The valves 108 and the valves 124 can further be equipped with pressure sensors. The controller 150 can receive information related to the pressure of fuel in the lines at the pump assembly 104 and the filtration system 120.

In some embodiments, when the test cells 110 are not operational fuel is continuously polished via the fuel polishing loop 132. Thus when the test cells 110 are not operational, all the fuel in the system 100 flows in the direction of the arrow (direction) labeled 134.

In some embodiments, when one or more of the test cells 110 are initiated (e.g., started or engaged), fuel is drawn from the fuel polishing loop 132 at the junction 160 in the direction of an arrow (direction) labeled 136 and provided to one or more of the test cells 110 via the fuel delivery path 138. The fuel delivery path 138 can also be referred to as a fuel delivery circuit. Due to the increase in mass flow of the fuel within the fuel delivery path 138, the mass flow of fuel within the polishing loop 132 necessarily decreases (e.g., the reserved flow). In some embodiments, the amount of flow in direction 134 can vary but may not ever be zero or flow in the reverse direction.

In some embodiments, the back pressure regulator 130 can be configured at a preselected mechanical set point. This mechanical set point can maintain the fuel output pressure to the test cells 110 at any instant of time.

In some embodiments, another electronic set point at a specific volume flow rate ($Q_{set}$) can be established by the controller 150 (also called polishing flow rate for the dual functionality). This can reserve a specific flow rate providing a reserved flow reservoir, to compensate for the output flow rate variation in the direction 136 to the fuel delivery path 138 and the test cells 110. As the fuel flow in the fuel polishing loop 132 decreases, the flow meter 140 communicates (e.g., via a change in current) with the controller 150 indicating the decrease in fuel flow. In order to maintain sufficient fuel flow within the fuel polishing loop 132 and fuel delivery path 138, the controller 150 can transmit commands to the pump assembly 104 to increase fuel flow. This can increase fuel flow and compensate for the draw against the reserved flow to the test cells 110. This arrangement provides a feedback loop to maintain a constant and stable fuel flow within the system 100, with minimum and acceptable pressure and flow variation, regardless of changes in demand output flow to the test cells 110.

INDUSTRIAL APPLICABILITY

When the output flow demand changes based on the initiation of one or more of the test cells 110, the reserved flow rate can compensate for changes in fuel flow instantaneously while maintaining the fuel pressure to the test cells 110 unchanged. The instantaneous response, resulting from characteristics of the internal pipe flow, can compensate for any delay required for the controller 150 to command the pump assembly 104 to increase output and for such increase to measure at the flow meter 140.

In a similar manner, one or more of the test cells 110 can be deactivated or shut down causing a decrease in the fuel flow in the direction 136 to the delivery path 138. Given the increased output of the pump assembly 104 (e.g., due to operation of at least one test cell 110), the flow meter 140 can measure increased flow, or at least a fuel flow above the set point. Accordingly, the controller 150 can command the pump assembly 104 to decrease output in response to the increase (e.g., change) in fuel flow within the polishing loop 132.

Thus the system 100 can compensate for flow variations in either a positive or negative way, at any instant of time, allowing the controller 150 and the pump assembly 104 to respond and increase or decrease fuel flow in the polishing loop 132. In addition, the fuel flow to the delivery path 138 via the junction 160, can be maintained at a constant pressure by the back pressure regulator 130, until the reserved/polishing flow rate decreases sufficiently to cause a reaction from the controller 150.

The controller 150 can command the pump assembly 104 (e.g., one or more VFD pumps) to target fuel pump motor RPM that can produce and maintain the reserved/polishing flow rate at the set point value, regardless of the demand output variation at the test cells 110. As a result, pump output delivery will increase when reserved flow is below the set point and vice versa. The controller 150 can further save pressure and flow data to the memory 154. Such data can be used for monitoring and recording performance of the system 100, for example. The flow data can aid the controller 150 in recognizing changes in test cell liquid fuel demand at any point of use and fit the amount of flow exactly, not under feeding nor over feeding, all of the test cells 110 operating on liquid fuel engine testing.

In some embodiments, the controller 150 can allow the system 100 to perform fuel delivery and polishing automatically. Based on indications from the flow meter 140, the controller 150 can recognize changes in fuel demand and adjust fuel flow rate for the test cells 110 without requiring a separate fuel return system from the point of use (e.g., the test cells 110). The polishing loop 132 can further provide an integrated fuel polishing system to improve fuel quality, achieving the dual functionality.

The system 100 can use hydrodynamic internal pipe flow characteristics coupled with variable frequency drive (VFD) pump motor control to realize automatic features. The polishing loop 132 and coupled to the delivery path 138 can form an intelligent fuel supply source, preparing quality, polished fuel, for delivery to the test cells 110. Without ambient interface condition change, such as constant flow demand (including zero demand), the system 100 can precisely meet ambient flow demands at the test cells 110. When fuel demand changes, either in a positive or negative manner, the system 100 can learn, analyze, and react, automatically fitting the external demand precisely and re-establishing the internal pre-set polishing fuel flow.

Figure 2:
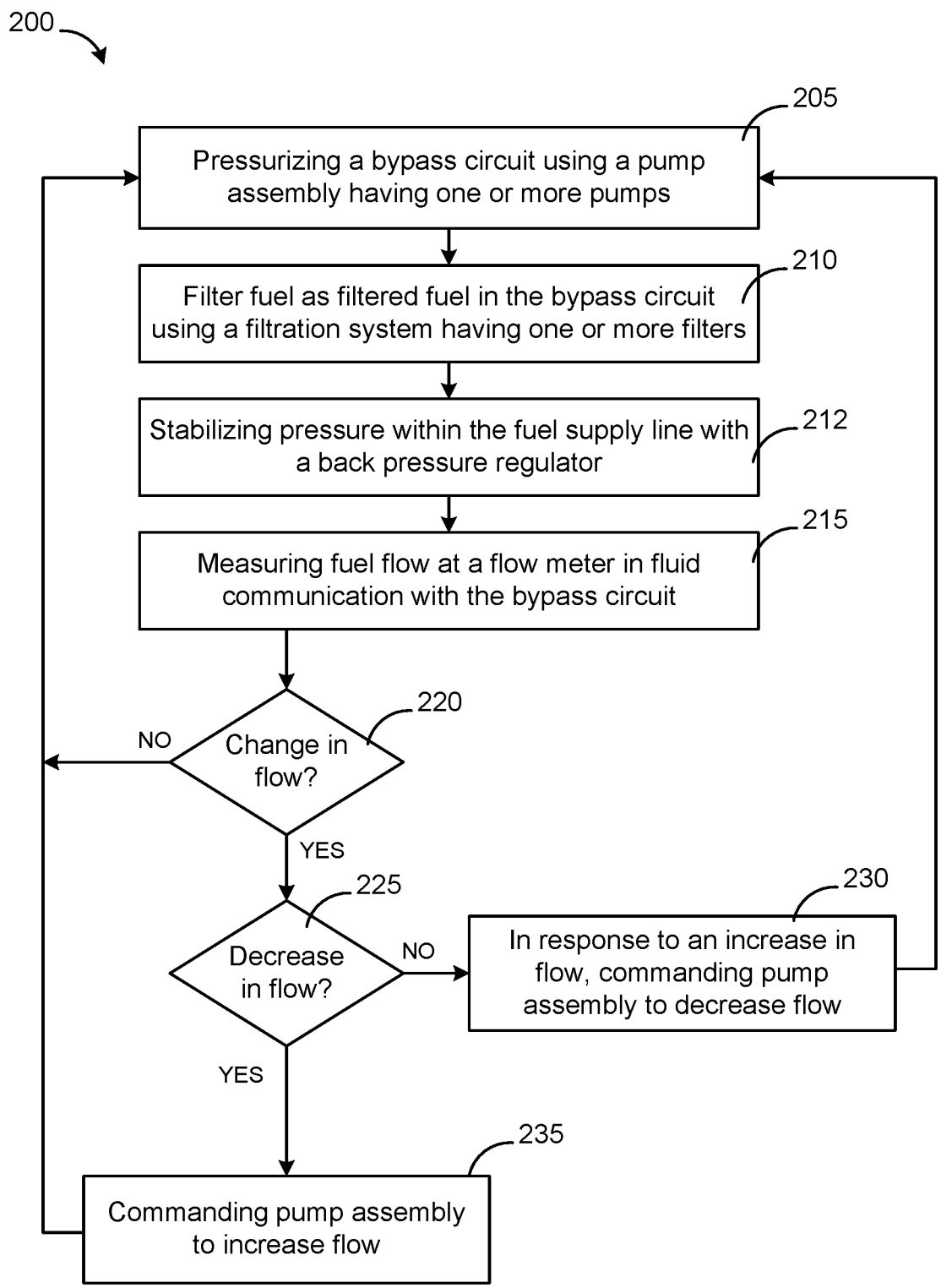
FIG. 2 is a flowchart of a method which can be performed by the system of FIG. 1.

FIG. 2 is a flowchart of a method performed by the system of FIG. 1. A method 200 can begin at block 205. At block 205, the controller 150 can command the pump assembly 104 to pressurize the polishing loop 132. The one or more pumps 106 can be used to maintain fuel flow within the supply lines 112a, 112c that form the polishing loop 132. Unless otherwise indicated, the following described steps of the method 200 are actions implemented or carried out by the controller 152.

At block 210, fuel in the polishing loop 132 can pass via the filtration system 120. The filtration system 120 and associated one or more filters 122 can continuously polish fuel supplied from the fuel tank 102 (e.g., fuel supply).

At block 212, the back pressure regulator 130 can stabilize fuel pressure within the supply lines 112. The back pressure regulator 130 can maintain pressure within the supply lines 112 (with minor deviations) from the mechanical set point defining a desired pressure. The pressure is maintained irrespective of fuel demand by the test cells.

At block 215, the flow meter 140 can measure fuel flow within the polishing loop 132 and communicate changes in fuel flow to the controller 152. The flow meter can be communicatively coupled to the controller 150 and provide indications (e.g., a change in current) of flow increase or decrease in the polishing loop 132.

At decision block 220, the controller 150 can detect a change in flow in as indicated by the flow meter 140. If there is no change in flow at decision block 220, the method 200 returns to block 205, maintaining a continuous fuel polishing cycle within the polishing loop 132. Thus the polishing loop 132 can have liquid fuel moving from the tank 102, the pump assembly 104, and the filtration system 120 (in the fuel supply line 112a), past the junction 160, and through the back pressure regulator 130 and flow meter 140 (in the fuel supply line 112c), back to the tank 102. If there is a change in fuel flow, the change can be an increase or decrease based on operations of the test cells 110.

At decision block 225, the controller 150 can determine if there is a decrease in fuel flow within the polishing loop 132. In some embodiments, as one more test cells 110 are initiated, fuel drawn to the delivery path 138 reduces the instantaneous fuel flow within the polishing loop 132. This decrease in fuel flow is detected by the flow meter 140. The controller 150 can recognize the change in flow as an increase or decrease in relation to the electronic set point of the flow meter 140.

If the controller 152 detects a decrease in fuel flow (decision block 225), the method 200 can move to block 235. At block 235, the controller 150 can command the pump assembly 104 to increase fuel flow within the polishing loop 132 to compensate for the decrease indicated by the flow meter 140.

If there is a change in fuel flow at decision block 220, and no decrease in fuel flow detected at decision block 225, an increase in fuel flow within the polishing loop 132 as indicated. Thus, the method 200 can move to block 230. In some embodiments, if one or more test cells 110 are shut down, fuel drawn to the delivery path 138 decreases, forcing the instantaneous fuel flow within the polishing loop 132 to increase. This increase in fuel flow within the polishing loop 132 can be indicated by the flow meter 140 to the controller 150.

At block 230, in response to the increase in flow within the polishing loop 132 the controller 150 can command the pump assembly 104 to decrease fuel flow.

In some examples, the efficiency of gas turbine engine test facilities operating multiple multi-functional gas turbine engine test cells 110 are dependent on varying degrees of liquid fuel availability, the subtlety of fuel demand schedules, and the requirement of increased fuel quality. In constant flow fuel supply systems, the test cells 110 may be coupled to both a fuel supply line and a separate fuel return systems. Equipping each test cell with individual supply and return lines can complicate fuel scheduling, return, and system maintenance. Separate supply and return lines also requires additional manpower to operate the various systems.

The system 100 can provide dual function fuel supply and filtration (e.g., fuel polishing). The system 100 is an automatic liquid fuel supply system that can provide required fuel flow and fuel quality for test cell 110 operations, and altogether eliminates the need for a separate fuel return system.

The system 100 can provide both continuous fuel polishing and automatic fuel delivery to the one or more test cells 110 by forming the polishing loop 132 at the output of the filtration system 120. The polishing loop 132, or bypass circuit, bypasses the test cells 110 and forms a fuel return having the back pressure regulator 130 and the flow meter 140. The flow meter 140 can send an electrical signal (e.g., a 4~20 mA) to the controller 150. The filtered liquid fuel bypasses the test cells 110 (when not in operation) from the output of the filtration system 120 and returns to the liquid fuel tank 102 forming a fuel polishing loop 132.

The system 100 can operate continuously without stopping. When none of the test cells 110 are operating, fuel demand to the test cells 110 is zero and the system 100 functions as a fuel polishing system, circulating the liquid fuel through the polishing loop 132 at the pre-selected flow rate defined by reserved flow meter set point. When one or more of the test cells 110 are operational, and fuel demand at the test cells 110 changes (e.g., increases or decreases), the reserved flow in the bypass line 132 can compensate for the instantaneous change in fuel flow to the test cells 110. Changes in flow at the flow meter 140 can be recognized by the controller 150, after which the reserved flow variation signal is sent to pump assembly 104 to re-establish the reserved flow set point.

Those of skill will appreciate that the various illustrative logical blocks (e.g., the various servers described herein), modules, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the design constraints imposed on the overall system. Skilled persons can implement the described functionality in varying ways for each particular application, but such implementation decisions should not be interpreted as causing a departure from the scope of the disclosure. In addition, the grouping of functions within a module, block or step is for ease of description. Specific functions or steps can be moved from one module or block without departing from the disclosure.

The various illustrative logical blocks and modules (e.g., the various servers described herein) described in connection with the embodiments disclosed herein can be implemented or performed with a general purpose processor, a digital signal processor (DSP), application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

What is claimed is:

1. A fuel system for providing fuel to one or more turbine engine test cells, the fuel system comprising:
a polishing loop configured to continuously polish fuel, the polishing loop comprising:
a fuel storage tank configured to store fuel for the one or more turbine engine test cells,
a pressure side of the polishing loop, the pressure side of the polishing loop comprising:
a pressure line,
a pump assembly in fluid communication with the fuel storage tank, the pump assembly configured to maintain fuel flow within the pressure line,
a filtration system in fluid communication with the pump assembly, the filtration system comprising one or more filters, and
wherein the pressure line provides fluid communication between the pump assembly and the fuel storage tank and between the pump assembly and the filtration system,
a junction, the junction in fluid communication with the filtration system and the fuel storage tank via the pressure line, and
a return side of the polishing loop, the return side of the polishing loop comprising:
a return line in fluid communication with the junction and with the fuel storage tank, and
a flow meter configured to measure fuel flow through the return line;
a delivery line coupled to the polishing loop at the junction and configured to deliver fuel to the one or more turbine engine test cells; and
a fuel control system having a processor and a memory coupled to the processor, the fuel control system communicatively coupled to the flow meter and communicatively coupled to the pump assembly, the fuel control system configured to adjust a pump rate of the pump assembly and configured to direct the fuel system to continuously polish the fuel when none of the one or more turbine engine test cells is operating.

2. The fuel system of claim 1, wherein the return side of the polishing loop further comprises a back pressure regulator configured to maintain a minimum fuel pressure within the fuel system upon initiation of the one or more test cells.

3. The fuel system of claim 2, wherein the flow meter is disposed between the back pressure regulator and the fuel storage tank.

4. The fuel system of claim 2, wherein the delivery line is coupled to the polishing loop between the filtration system and the back pressure regulator.

5. The fuel system of claim 1, wherein the pump assembly comprises one or more variable frequency drive (VFD) pumps and one or more associated bypass valves.

6. The fuel system of claim 1, wherein the filtration system comprises one or more bypass valves associated with the one or more filters.

7. The fuel system of claim 1, wherein the fuel control system is further configured to command the pump assembly to decrease fuel flow if fuel flow through the flow meter rises above a set point, the set point based on a shutdown of the one or more turbine engine test cells.

8. A method for operating the fuel system of claim 1, the method comprising:

pressurizing a fuel within the polishing loop via the pump assembly;

filtering the fuel using the filtration system;

measuring a fuel flow through the polishing loop using the flow meter;

in response to a decrease in the fuel flow within the polishing loop indicated by the flow meter, increasing the fuel flow within the polishing loop; and in response to an increase in the fuel flow within the polishing loop indicated by the flow meter, decreasing the fuel flow within the polishing loop.

9. The method of claim 8 further comprising, delivering the fuel to the one or more turbine engine test cells via the delivery line.

10. The method of claim 8 further comprising, preventing a back pressure from falling below a minimum polishing loop pressure using a back pressure regulator in fluid communication with the polishing loop.

11. The method of claim 8 further comprising, storing the fuel in the fuel storage tank.

12. The method of claim 8 further comprising, returning a polished fuel to the fuel storage tank.

\* \* \* \* \*